(12) United States Patent
Aota et al.

(10) Patent No.: US 8,096,914 B2
(45) Date of Patent: Jan. 17, 2012

(54) AUTOMATIC TRANSMISSION

(75) Inventors: Kazuaki Aota, Sagamihara (JP);
Yukiyoshi Inuta, Sagamihara (JP);
Akihiro Yamamoto, Isehara (JP); Naoki Kobayashi, Machida (JP); Takayuki Okuda, Atsugi (JP); Peter Tenberge, Chemnitz (DE); Joerg Mueller, Chemnitz (DE); Rico Resch, Wilsdruff (DE)

(73) Assignee: Jatco Ltd, Fuji-shi (JP)

( * ) Notice: Subject to any disclaimer, the term of this patent is extended or adjusted under 35 U.S.C. 154(b) by 108 days.

(21) Appl. No.: 12/731,899

(22) Filed: Mar. 25, 2010

(65) Prior Publication Data
US 2010/0273601 A1 Oct. 28, 2010

(30) Foreign Application Priority Data
Mar. 26, 2009 (JP) .................. 2009-075584

(51) Int. Cl.
*F16H 3/62* (2006.01)
(52) U.S. Cl. ........................ 475/275; 475/323
(58) Field of Classification Search .............. 475/275, 475/323
See application file for complete search history.

(56) References Cited

U.S. PATENT DOCUMENTS

| 6,932,735 | B2 | 8/2005 | Kao et al. | |
| 7,094,173 | B2 * | 8/2006 | Raghavan et al. | 475/276 |
| 7,611,438 | B2 | 11/2009 | Diosi et al. | |
| 7,731,622 | B2 * | 6/2010 | Wittkopp et al. | 475/275 |
| 2003/0232687 | A1 | 12/2003 | Bucknor et al. | |
| 2004/0229725 | A1 | 11/2004 | Hiraiwa | |
| 2005/0090362 | A1 | 4/2005 | Abe et al. | |
| 2006/0148610 | A1 | 7/2006 | Usoro et al. | |
| 2007/0259753 | A1 | 11/2007 | Diosi et al. | |
| 2008/0242479 | A1 | 10/2008 | Hart et al. | |
| 2008/0242484 | A1 | 10/2008 | Hart et al. | |
| 2008/0293535 | A1 | 11/2008 | Phillips et al. | |
| 2008/0300088 | A1 | 12/2008 | Hart et al. | |
| 2009/0023538 | A1 | 1/2009 | Carey et al. | |
| 2009/0036254 | A1 | 2/2009 | Wittkopp et al. | |
| 2010/0184553 | A1 | 7/2010 | Wittkopp et al. | |

FOREIGN PATENT DOCUMENTS

| DE | 10 2004 041 446 A1 | 3/2006 |
| EP | 1 398 528 A2 | 3/2004 |
| EP | 1 398 533 A2 | 3/2004 |

(Continued)

OTHER PUBLICATIONS

U.S. Appl. No. 12/847,380, filed Jul. 30, 2010, Yamamoto et al.

(Continued)

*Primary Examiner* — David D Le
*Assistant Examiner* — Derek D Knight
(74) *Attorney, Agent, or Firm* — Foley & Lardner LLP (57) ABSTRACT

An automatic transmission including three single pinion planetary gearsets and six friction elements, in which an input shaft is always connected to a first sun gear of a first planetary gearset, the output shaft is always connected to a second ring gear of a second planetary gearset, a third sun gear of a third planetary gearset is always kept in a fixed state relative to a transmission case of the automatic transmission, a first ring gear of the first planetary gearset and a third pinion carrier of the third planetary gearset are always connected to each other and constitute a first rotary member, and at least eight forward speeds and one reverse speed are respectively established by simultaneous engagements of three friction elements selected from the six friction elements.

3 Claims, 7 Drawing Sheets

FOREIGN PATENT DOCUMENTS

JP          2001-182785 A      7/2001

OTHER PUBLICATIONS

U.S. Appl. No. 12/847,421, filed Jul. 30, 2010, Yamamoto et al.

U.S. Appl. No. 12/947,378, filed Nov. 16, 2010, Aota et al.
U.S. Appl. No. 12/731,892, Mar. 25, 2010, Aota et al.
A. Yamamoto, U.S. PTO Office Action, U.S. Appl. No. 12/847,380, dated Nov. 7, 2011, 12 pages.

* cited by examiner

ρ1=0.480
ρ2=0.399   RC=7.302
ρ3=0.540   REV/1ST=0.831

|  | C1 | C2 | C3 | C4 | C5 | B1 | GEAR RATIO | STEP RATIO |
|---|---|---|---|---|---|---|---|---|
| 1ST |  |  | ○ | ○ |  | ○ | 5.221 | 1.540 |
| 2ND |  |  | ○ |  | ○ | ○ | 3.391 | 1.538 |
| 3RD |  |  | ○ | ○ | ○ |  | 2.204 | 1.274 |
| 4TH |  | ○ | ○ |  | ○ |  | 1.731 | 1.358 |
| 5TH | ○ |  | ○ |  | ○ |  | 1.275 | 1.275 |
| 6TH | ○ | ○ | ○ |  |  |  | 1.000 | 1.168 |
| 7TH | ○ | ○ |  |  | ○ |  | 0.856 | 1.197 |
| 8TH | ○ |  |  | ○ | ○ |  | 0.715 |  |
| REV |  | ○ |  |  | ○ | ○ | -4.337 |  |

FIG.3

GEAR MESHING NUMBER

|  | 1ST | 2ND | 3RD | 4TH | 5TH | 6TH | 7TH | 8TH | AVERAGE MESHING NUMBER |
|---|---|---|---|---|---|---|---|---|---|
| PLANETARY GEARSET 1 | 2 | 2 | 2 | 2 | 0 | 0 | 2 | 0 | - |
| PLANETARY GEARSET 2 | 2 | 2 | 2 | 0 | 2 | 0 | 2 | 2 | - |
| PLANETARY GEARSET 3 | 0 | 2 | 0 | 2 | 2 | 0 | 2 | 0 | - |
| TOTAL | 4 | 6 | 4 | 4 | 4 | 0 | 6 | 2 | 3.75 |

|  | C1 | C2 | C3 | C4 | B1 | B2 | GEAR RATIO |
|---|---|---|---|---|---|---|---|
| 1ST | ○ |  |  |  |  | ○ | 4.267 |
| 2ND | ○ |  |  |  | ○ |  | 2.489 |
| 3RD | ○ | ○ |  |  |  |  | 1.600 |
| 4TH | ○ |  |  | ○ |  |  | 1.318 |
| 5TH | ○ |  | ○ |  |  |  | 1.164 |
| 6TH |  |  | ○ | ○ |  |  | 1.000 |
| 7TH |  | ○ | ○ |  |  |  | 0.842 |
| 8TH |  |  | ○ |  | ○ |  | 0.667 |
| REV1 |  | ○ |  |  |  | ○ | 3.200 |
| REV2 |  |  |  | ○ |  | ○ | 2.000 |

FIG.15

SINGLE PINION: 2
DOUBLE-PINION: 3

GEAR MESHING NUMBER

|  | 1ST | 2ND | 3RD | 4TH | 5TH | 6TH | 7TH | 8TH | AVERAGE MESHING NUMBER |
|---|---|---|---|---|---|---|---|---|---|
| PLANETARY GEARSET 1 | 3 | 3 | 3 | 3 | 3 | 0 | 3 | 0 | - |
| PLANETARY GEARSET 2 | 0 | 2 | 0 | 2 | 0 | 0 | 2 | 2 | - |
| PLANETARY GEARSET 3 | 3 | 3 | 0 | 3 | 3 | 0 | 0 | 0 | - |
| TOTAL | 6 | 8 | 3 | 8 | 6 | 0 | 5 | 2 | 4.8 |

AUTOMATIC TRANSMISSION

BACKGROUND OF THE INVENTION

The present invention relates to an automatic transmission for a vehicle in which multiple speeds or a wide gear ratio range are required.

Conventionally, there have been proposed various multiple-speed transmissions that realize eight forward speeds using three planetary gearsets and six friction elements. Japanese Patent Application Provisional Publication No. 2001-182785 discloses such an eight forward-speed transmission that includes a double-pinion planetary gearset, a Ravigneaux planetary gear unit (a combination of a double-pinion planetary gearset and a single pinion planetary gearset), four clutches, and two brakes.

However, in the above conventional art, the following problems are caused due to the two double-pinion planetary gearsets used.
(1) The number of meshing engagement between gears is increased to thereby cause deterioration in gear efficiency and gear noise.
(2) A diameter of the pinion gears is reduced to thereby lower endurance reliability of the transmission.
(3) The number of parts in the transmission is increased to thereby cause an increase in cost.

In addition, in the above conventional art, it is required that two of the six friction elements are in an engagement state in order to establish the eight forward speeds. Due to this construction, the remaining four friction elements are idle at the respective speeds. This results in increase in friction loss in the idling friction elements, thereby causing deterioration in driving energy transmission efficiency.

The present invention has been made in view of the above problems. It is an object of the present invention to provide an automatic transmission that is advantageous in view of gear efficiency, reduction of gear noise, endurance reliability, and cost performance and is capable of increasing driving energy transmission efficiency by reducing friction loss in friction elements.

In one aspect of the present invention, there is provided an automatic transmission that includes an input shaft, an output shaft, a first planetary gearset including a first sun gear, a first pinion carrier that supports a first pinion gear meshing with the first sun gear, and a first ring gear meshing with the first pinion gear, a second planetary gearset including a second sun gear, a second pinion carrier that supports a second pinion gear meshing with the second sun gear, and a second ring gear meshing with the second pinion gear, a third planetary gearset including a third sun gear, a third pinion carrier that supports a third pinion gear meshing with the third sun gear, and a third ring gear meshing with the third pinion gear, and six friction elements, the automatic transmission being capable of establishing at least eight forward speeds by suitably engaging and disengaging the six friction elements and outputting a torque from the input shaft to the output shaft,
wherein the input shaft is always connected to the first sun gear,
the output shaft is always connected to the second ring gear,
the third sun gear is always kept in a fixed state relative to a transmission case of the automatic transmission,
the first ring gear and the third pinion carrier are always connected to each other and constitute a first rotary member,
the six friction elements include a first friction element that selectively connects the first sun gear and the second pinion carrier, a second friction element that selectively connects the first pinion carrier and the second sun gear, a third friction element that selectively connects the first pinion carrier and the second pinion carrier, a fourth friction element that selectively connects the second sun gear and the first rotary member, a fifth friction element that selectively connects the second sun gear and the third ring gear, and a sixth friction element that is operative to interrupt rotation of the second pinion carrier, and
at least eight forward speeds and one reverse speed are respectively established by simultaneous engagements of three friction elements selected from the six friction elements.

DETAILED DESCRIPTION OF THE INVENTION

Referring to FIGS. 1-12, an automatic transmission according to an embodiment of the present invention is explained.

Figure 1:
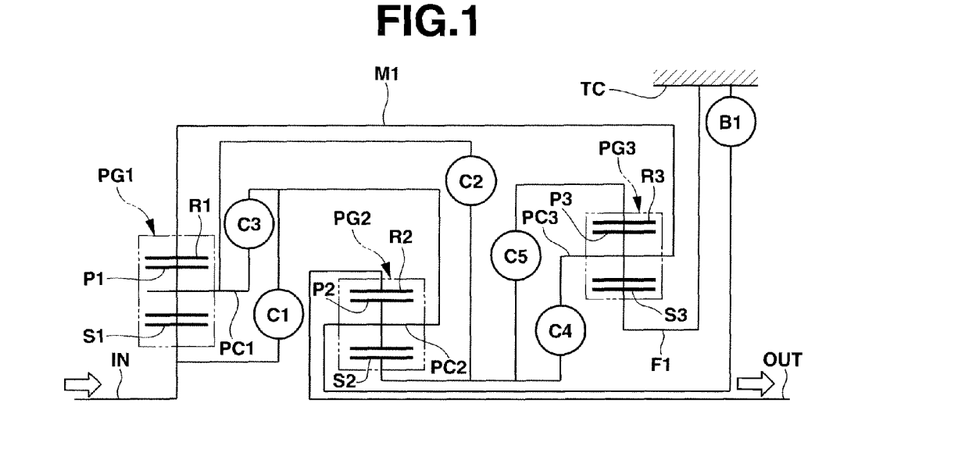
FIG. 1 is a skeleton diagram showing a construction of an automatic transmission according to an embodiment of the present invention.

FIG. 1 is a skeleton diagram showing a construction of the automatic transmission according to the embodiment, specifically, a construction of planetary gearsets and a construction of friction elements in the automatic transmission.

As shown in FIG. 1, the automatic transmission according to the embodiment includes first planetary gearset PG1, second planetary gearset PG2, third planetary gearset PG3, input shaft IN, output shaft OUT, first fixing member F1, first rotary member M1, first clutch C1 (i.e., first friction element), second clutch C2 (i.e., second friction element), third clutch C3 (i.e., third friction element), fourth clutch C4 (i.e., fourth friction element), fifth clutch C5 (i.e., fifth friction element), first brake B1 (i.e., sixth friction element), and transmission case TC.

First planetary gearset PG1 is a single pinion planetary gearset including first sun gear S1, first pinion carrier PC1 supporting first pinion gear P1 that is in meshing engagement with first sun gear S1, and first ring gear R1 that is in meshing engagement with first pinion gear P1.

Second planetary gearset PG2 is a single pinion planetary gearset including second sun gear S2, second pinion carrier PC2 supporting second pinion gear P2 that is in meshing engagement with second sun gear S2, and second ring gear R2 that is in meshing engagement with second pinion gear P2.

Third planetary gearset PG3 is a single pinion planetary gearset including third sun gear S3, third pinion carrier PC3 supporting third pinion gear P3 that is in meshing engagement with third sun gear S3, and third ring gear R3 that is in meshing engagement with third pinion gear P3.

Input shaft IN receives rotational driving torque that is transmitted from a drive source (i.e., an engine or the like) via a torque converter and the like. Input shaft IN is always connected to first sun gear S1.

Output shaft OUT outputs the driving torque to a driving wheel via a propeller shaft, a final gear and the like after gear speed change. Output shaft OUT is always connected to second ring gear R2.

Fixing member F1 always holds third sun gear S3 against rotation relative to transmission case TC.

First rotary member M1 is a rotary member constituted of first ring gear R1 and third pinion carrier PC3 which are always connected to each other without intervention of a friction element.

First clutch C1 is a first friction element that selectively connects first sun gear S1 and second pinion carrier PC2.

Second clutch C2 is a second friction element that selectively connects first pinion carrier PC1 and second sun gear S2.

Third clutch C3 is a third friction element that selectively connects first pinion carrier PC1 and second pinion carrier PC2.

Fourth clutch C4 is a fourth friction element that selectively connects second sun gear S2 and first rotary member M1.

Fifth clutch C5 is a fifth friction element that selectively connects second sun gear S2 and third ring gear R3.

First brake B1 is a sixth friction element that is operative to interrupt rotation of second pinion carrier PC2 relative to transmission case TC.

First planetary gearset PG1, second planetary gearset PG2 and third planetary gearset PG3 are continuously arranged in this order from input shaft IN to be connected with the drive source toward output shaft OUT as shown in FIG. 1.

Figure 2:
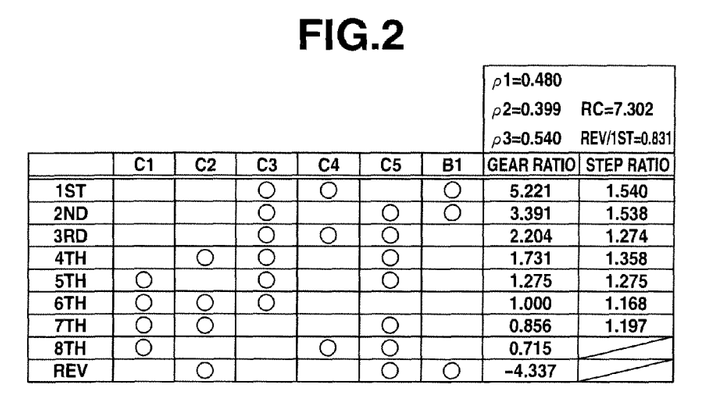
FIG. 2 is a table showing an engagement schedule of six friction elements of the automatic transmission according to the embodiment for establishing eight forward speeds and one reverse speed by simultaneous engagements of specific three friction elements selected from the six friction elements.
Figure 3:
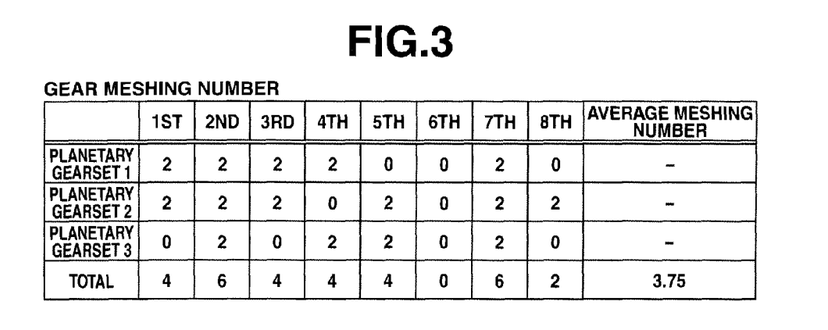
FIG. 3 is a table showing the number of meshing engagement between gears at the respective eight forward speeds.

FIG. 2 is a table showing an engagement schedule of six friction elements of the automatic transmission according to the embodiment, in which eight forward speeds and one reverse speed are respectively established by simultaneous engagements of three friction elements selected from the six friction elements. FIG. 3 is a table showing the number of meshing engagement between adjacent two gears of the respective first to third planetary gearsets to establish the respective eight forward speeds. Referring to FIG. 2 and FIG. 3, a speed change construction in the automatic transmission of this embodiment will be explained hereinafter.

The automatic transmission of this embodiment establishes the respective speeds of eight forward speeds and one reverse speed by simultaneous engagements of three friction elements selected from the six friction elements C1, C2, C3, C4, C5 and B1.

As shown in FIG. 2, the first speed (1st) is established by simultaneous engagements of third clutch C3, fourth clutch C4 and first brake B1. First planetary gearset PG1 and second planetary gearset PG2 are concerned with establishment of the first speed. Accordingly, as shown in FIG. 3, the number of meshing engagement between adjacent two gears (hereinafter simply referred to as the gear meshing number) at the first speed is four (i.e., 2×2) in total.

As shown in FIG. 2, the second speed (2nd) is established by simultaneous engagements of third clutch C3, fifth clutch C5 and first brake B1. First planetary gearset PG1, second planetary gearset PG2 and third planetary gearset PG3 are concerned with establishment of the second speed. Accordingly, as shown in FIG. 3, the gear meshing number at the second speed is six (i.e., 2×3) in total.

As shown in FIG. 2, the third speed (3rd) is established by simultaneous engagements of third clutch C3, fourth clutch C4 and fifth clutch C5. First planetary gearset PG1 and second planetary gearset PG2 are concerned with establishment of the third speed. Accordingly, as shown in FIG. 3, the gear meshing number at the third speed is four (i.e., 2×2) in total.

As shown in FIG. 2, the fourth speed (4th) is established by simultaneous engagements of second clutch C2, third clutch C3 and fifth clutch C5. First planetary gearset PG1 and third planetary gearset PG3 are concerned with establishment of the fourth speed. Accordingly, as shown in FIG. 3, the gear meshing number at the fourth speed is four (i.e., 2×2) in total.

As shown in FIG. 2, the fifth speed (5th) is established by simultaneous engagements of first clutch C1, third clutch C3 and fifth clutch C5. Second planetary gearset PG2 and third planetary gearset PG3 are concerned with establishment of the fifth speed. Accordingly, as shown in FIG. 3, the gear meshing number at the fifth speed is four (i.e., 2×2) in total.

As shown in FIG. 2, the sixth speed (6th) is established by simultaneous engagements of first clutch C1, second clutch C2 and third clutch C3. None of first planetary gearset PG1, second planetary gearset PG2 and third planetary gearset PG3 are concerned with establishment of the sixth speed. Accordingly, as shown in FIG. 3, the gear meshing number at the sixth speed is zero in total.

As shown in FIG. 2, the seventh speed (7th) is established by simultaneous engagements of first clutch C1, second clutch C2 and fifth clutch C5. First planetary gearset PG1, second planetary gearset PG2 and third planetary gearset PG3 are concerned with establishment of the seventh speed. Accordingly, as shown in FIG. 3, the gear meshing number at the seventh speed is six (i.e., 2×3) in total.

As shown in FIG. 2, the eighth speed (8th) is established by simultaneous engagements of first clutch C1, fourth clutch C4 and fifth clutch C5. Only second planetary gearset PG2 is concerned with establishment of the eighth speed. Accordingly, as shown in FIG. 3, the gear meshing number at the eighth speed is two in total.

As shown in FIG. 2, the reverse speed (Rev) is established by simultaneous engagements of second clutch C2, fifth clutch C5 and first brake B1.

An operation of the automatic transmission of this embodiment will be explained hereinafter with respect to "an operation at the respective speeds" and "an advantage in comparison to a conventional art".

Speed Change Operation at Respective Speeds

Referring to FIG. 4 to FIG. 12, the operation at the respective speeds is explained.

(First Speed)

Figure 4:
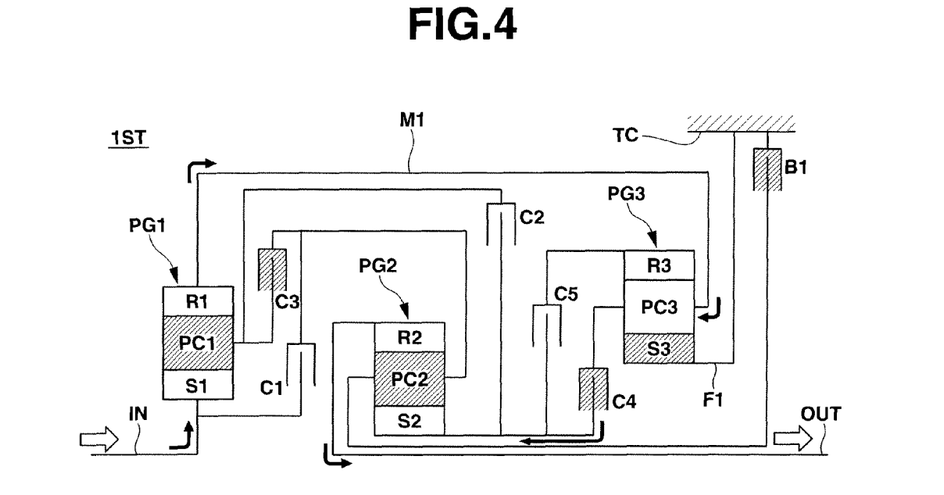
FIG. 4 is an explanatory diagram showing a shift operation at a first speed in the automatic transmission according to the embodiment.

At the first speed (1st), third clutch C3, fourth clutch C4 and first brake B1 are brought into simultaneous engagements as indicated by hatching in FIG. 4.

Owing to the simultaneous engagements of third clutch C3 and first brake B1, first pinion carrier PC1 and second pinion carrier PC2 are fixed to transmission case TC. Third sun gear S3 of third planetary gearset PG3 is always kept fixed to transmission case TC by first fixing member F1.

As shown in FIG. 4, when input rotation from the drive source is inputted to first sun gear S1 via input shaft IN, speed-reduced reverse rotation of first ring gear R1 is caused at a reduced speed at first planetary gearset PG1 with first pinion carrier PC1 being kept fixed. The speed-reduced reverse rotation of first ring gear R1 is inputted to second sun gear S2 without being changed via first rotary member M1, third pinion carrier PC3 and fourth clutch C4. At second planetary gearset PG2 with pinion carrier PC2 being kept fixed, the input rotation inputted to second sun gear S2 (i.e., the speed-reduced reverse rotation) is converted into speed-reduced positive rotation which is then outputted from second ring gear R2. The output rotation (i.e., the speed-reduced rotation having a speed lower than the input rotation speed) is transmitted without change from second ring gear R2 to output shaft OUT. The first speed is thus established.

(Second Speed)

Figure 5:
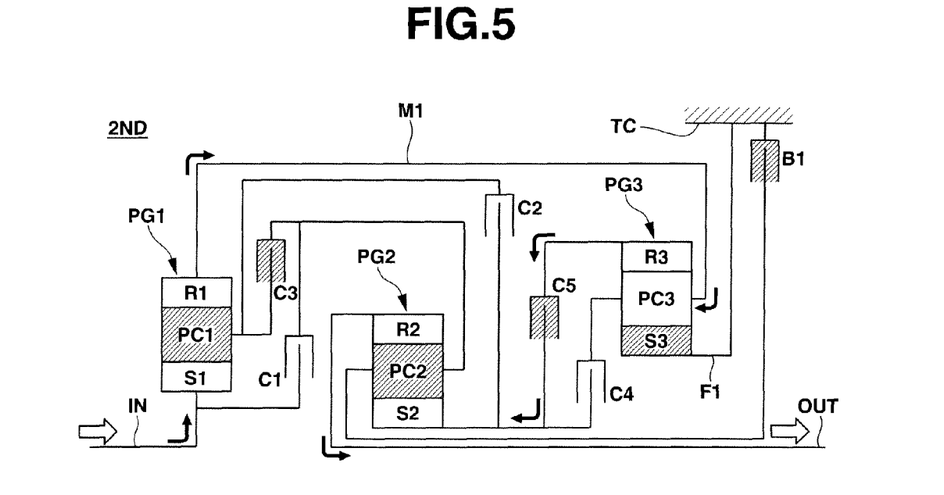
FIG. 5 is an explanatory diagram showing a shift operation at a second speed in the automatic transmission according to the embodiment.

At the second speed (2nd), third clutch C3, fifth clutch C5 and first brake B1 are brought into simultaneous engagements as indicated by hatching in FIG. 5.

Owing to the simultaneous engagements of third clutch C3 and first brake B1, first pinion carrier PC1 and second pinion carrier PC2 are fixed to transmission case TC. Third sun gear S3 of third planetary gearset PG3 is always kept fixed to transmission case TC by first fixing member F1.

As shown in FIG. 5, when input rotation from the drive source is inputted to first sun gear S1 via input shaft IN, speed-reduced reverse rotation of first ring gear R1 is caused at first planetary gearset PG1 with first pinion carrier PC1 being kept fixed. The speed-reduced reverse rotation of first ring gear R1 is inputted to third pinion carrier PC3 via first rotary member M1. At third planetary gearset PG3 with sun gear S3 being kept fixed, a speed of the rotation inputted to third pinion carrier PC3 is increased and rotation of third ring gear R3 (i.e., speed-reduced reverse rotation relative to the input rotation) is caused. The rotation of third ring gear R3 is inputted to second sun gear S2 via fifth clutch C5 without being changed. At second planetary gearset PG2 with pinion carrier PC2 being kept fixed, the rotation inputted to second sun gear S2 (i.e., the speed-reduced reverse rotation) is converted into speed-reduced positive rotation which is then outputted from second ring gear R2. The output rotation (i.e., speed-reduced rotation having a speed lower than the input rotation speed but higher than the first speed) is transmitted without change from second ring gear R2 to output shaft OUT. The second speed is thus established.

(Third Speed)

Figure 6:
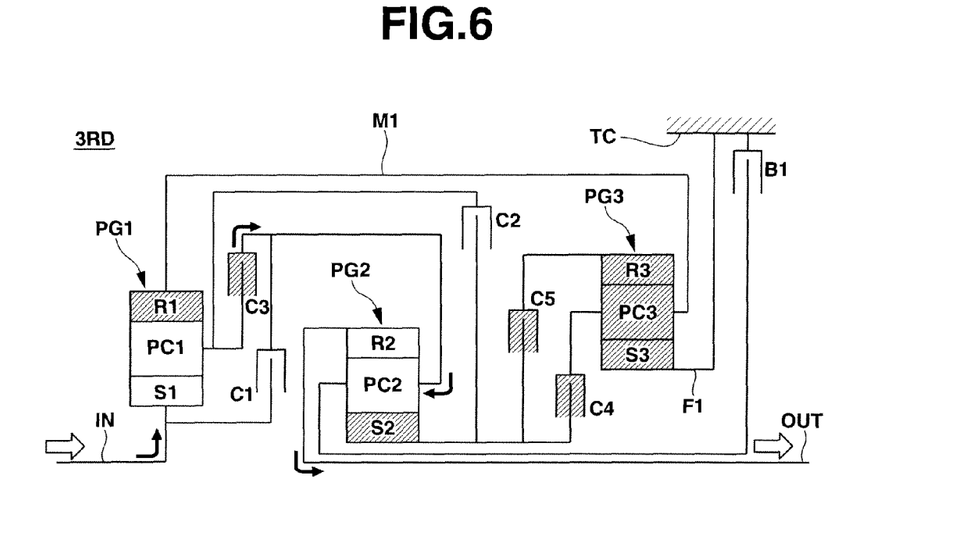
FIG. 6 is an explanatory diagram showing a shift operation at a third speed in the automatic transmission according to the embodiment.

At the third speed (3rd), third clutch C3, fourth clutch C4 and fifth clutch C5 are brought into simultaneous engagements as indicated by hatching in FIG. 6.

Owing to the simultaneous engagements of fourth clutch C4 and fifth clutch C5, third sun gear S3 being always kept in the fixed state relative to transmission case TC, and first rotary member M1 always connecting first ring gear R1 and third pinion carrier PC3, first ring gear R1, second sun gear S2 and third planetary gearset PG3 (i.e., third sun gear S3, third pinion carrier PC3 and third ring gear R3) are fixed to transmission case TC.

As shown in FIG. 6, when input rotation from the drive source is inputted to first sun gear S1 via input shaft IN, speed-reduced positive rotation of first pinion carrier PC1 is caused at first planetary gearset PG1 with first ring gear R1 being kept fixed. The speed-reduced positive rotation of first pinion carrier PC1 is inputted to second pinion carrier PC2 via third clutch C3 without being changed. At second planetary gearset PG2 with fixed sun gear S2, the rotation inputted to second pinion carrier PC2 (i.e., the speed-reduced positive rotation) is increased in speed and then outputted from second ring gear R2. The output rotation (i.e., speed-reduced rotation having a speed lower than the input rotation speed but higher than the second speed) is transmitted without change from second ring gear R2 to output shaft OUT. The third speed is thus established.

(Fourth Speed)

Figure 7:
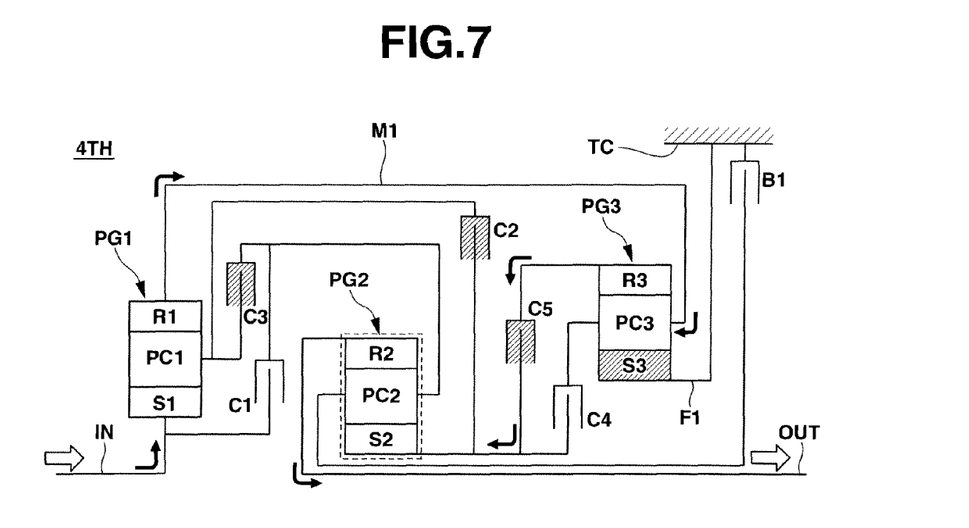
FIG. 7 is an explanatory diagram showing a shift operation at a fourth speed in the automatic transmission according to the embodiment.

At the fourth speed (4th), second clutch C2, third clutch C3 and fifth clutch C5 are brought into simultaneous engagements as indicated by hatching in FIG. 7.

Owing to the simultaneous engagements of second clutch C2, third clutch C3 and fifth clutch C5, first pinion carrier PC1, second planetary gearset PG2 (i.e., second sun gear S2, second pinion carrier PC2 and second ring gear R2) and third ring gear R3 are allowed to make a unitary rotation with the output rotation speed. Third sun gear S3 of third planetary gearset PG3 is always kept fixed to transmission case TC by first fixing member F1.

As shown in FIG. 7, when input rotation from the drive source is inputted to first sun gear S1 of first planetary gearset PG1 via input shaft IN and output rotation of second planetary gearset PG2 is inputted to first pinion carrier PC1 via second clutch C2, speed-reduced positive rotation of first ring gear R1 is caused at first planetary gearset PG1 that has two inputs and one output. The rotation of first ring gear R1 is inputted to third pinion carrier PC3 via first rotary member M1. At third planetary gearset PG3 with third sun gear S3 being kept fixed, speed-increased positive rotation of third ring gear R3 is caused. The rotation (i.e., an output rotation) of third ring gear R3 is inputted to second sun gear S2 via fifth clutch C5 and then inputted to first pinion carrier PC1 via second clutch C2. At second planetary gearset PG2 being kept under a unitary rotation, output rotation (i.e., speed-reduced rotation having a speed lower than the input rotation speed but higher than the third speed) is transmitted without change from second ring gear R2 to output shaft OUT. The fourth speed is thus established.

(Fifth Speed)

Figure 8:
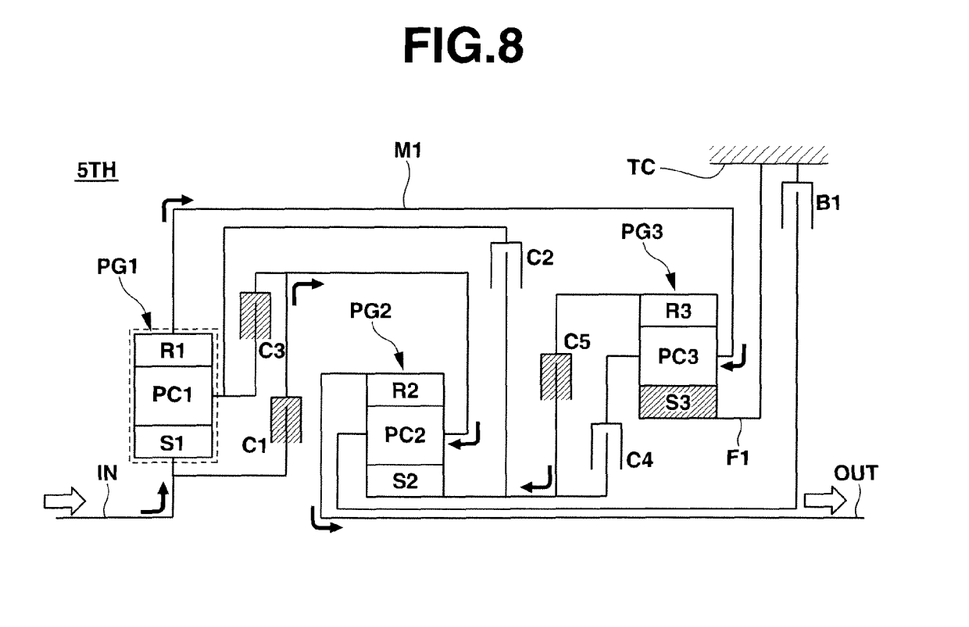
FIG. 8 is an explanatory diagram showing a shift operation at a fifth speed in the automatic transmission according to the embodiment.

At the fifth speed (5th), first clutch C1, third clutch C3 and fifth clutch C5 are brought into simultaneous engagements as indicated by hatching in FIG. 8.

Owing to the simultaneous engagements of first clutch C1 and third clutch C3, first planetary gearset PG1 (i.e., first sun gear S1, first pinion carrier PC1 and first ring gear R1), second pinion carrier PC2 and third pinion carrier PC3 are allowed to make a unitary rotation with the input rotation speed. Third sun gear S3 of third planetary gearset PG3 is always kept fixed to transmission case TC by first fixing member F1.

As shown in FIG. 8, when input rotation from the drive source is inputted to third pinion carrier PC3 via input shaft IN, first planetary gearset PG1 and first rotary member M1, speed-increased positive rotation of third ring gear R3 is caused at third planetary gearset PG3 with third sun gear S3 being kept fixed. The rotation of third ring gear R3 is inputted to second sun gear S2 via fifth clutch C5. On the other hand, the input rotation is inputted to second pinion carrier PC2 via input shaft IN and first clutch C1. Therefore, at second planetary gearset PG2 that has two inputs and one output, an output rotation speed of second ring gear R2 is determined in accordance with the rotation speed of second sun gear S2 and the rotation speed of second pinion carrier PC2. The output rotation (i.e., speed-reduced rotation having a speed lower than the input rotation speed but higher than the fourth speed) is transmitted without change from second ring gear R2 to output shaft OUT. The fifth speed is thus established.

(Sixth Speed)

Figure 9:
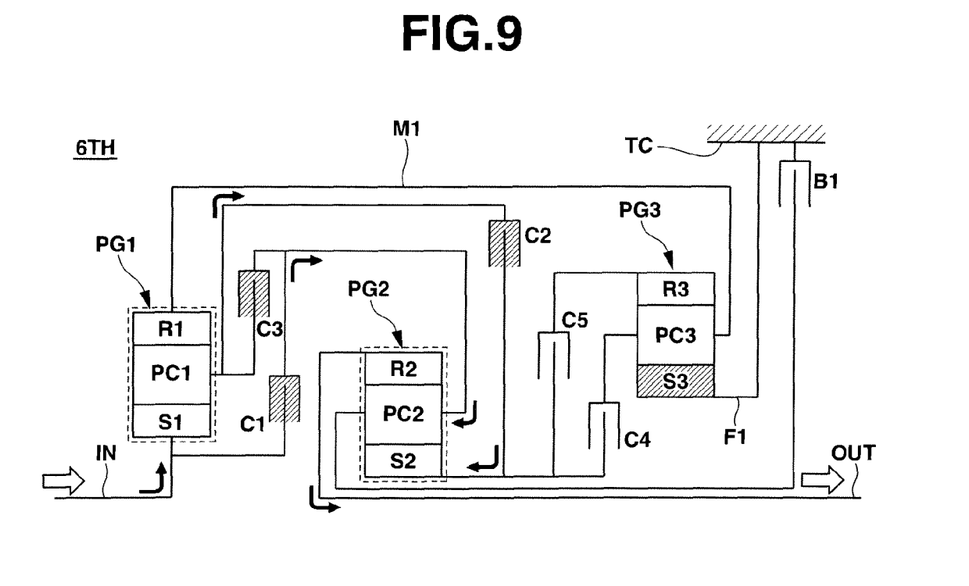
FIG. 9 is an explanatory diagram showing a shift operation at a sixth speed in the automatic transmission according to the embodiment.

At the sixth speed (6th), first clutch C1, second clutch C2 and third clutch C3 are brought into simultaneous engagements as indicated by hatching in FIG. 9.

Owing to the simultaneous engagements of first clutch C1, second clutch C2 and third clutch C3, first planetary gearset PG1 and second planetary gearset PG2 are allowed to make a unitary rotation with the input rotation speed. Therefore, the rotation speed of output shaft OUT becomes equal to the input rotation speed from input shaft IN, so that the sixth speed (i.e., direct-coupling speed) at which the gear ratio is 1 is established.

(Seventh Speed)

Figure 10:
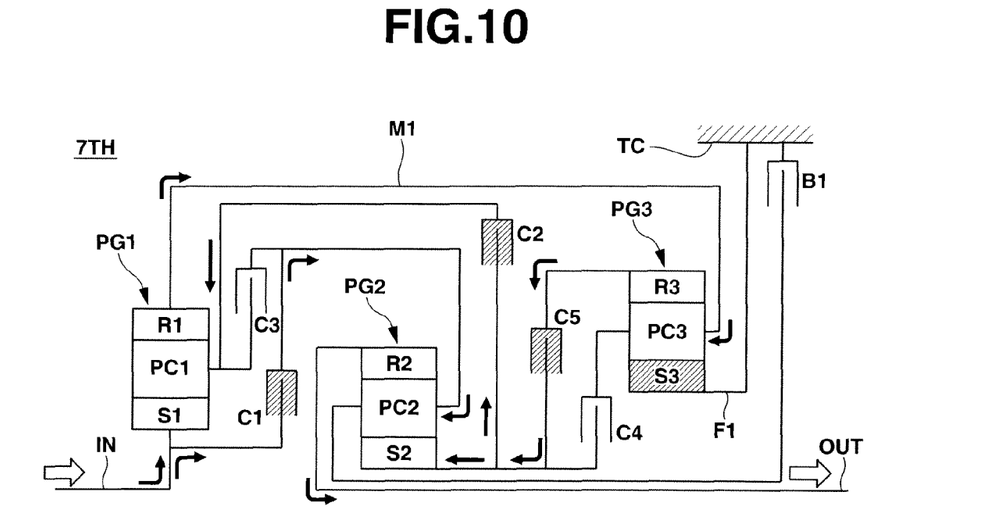
FIG. 10 is an explanatory diagram showing a shift operation at a seventh speed in the automatic transmission according to the embodiment.

At the seventh speed (7th), first clutch C1, second clutch C2 and fifth clutch C5 are brought into simultaneous engagements as indicated by hatching in FIG. 10.

Owing to the engagement of first clutch C1, the input rotation speed is inputted to second pinion carrier PC2. Further, owing to the simultaneous engagements of second clutch C2 and fifth clutch C5, first pinion carrier PC1, second sun gear S2 and third ring gear R3 are allowed to make the same rotation. Third sun gear S3 of third planetary gearset PG3 is always kept fixed to transmission case TC by first fixing member F1.

As shown in FIG. 10, when input rotation from the drive source is inputted to first sun gear S1 via input shaft IN and output rotation of second sun gear S2 is inputted to first pinion carrier PC1 via second clutch C2, speed-reduced positive rotation of first ring gear R1 is caused at first planetary gearset PG1 that has two inputs and one output. When the speed-reduced positive rotation of first ring gear R1 is inputted to third pinion carrier PC3 via first rotary member M1, speed-increased positive rotation of third ring gear R3 is caused at third planetary gearset PG3 with third sun gear S3 being kept fixed. The speed-increased positive rotation of third ring gear R3 is inputted to second sun gear S2 via fifth clutch C5. On the other hand, the input rotation is inputted to second pinion carrier PC2 via input shaft IN and first clutch C1. Therefore, at second planetary gearset PG2 that has two inputs and one output, the output rotation speed of second ring gear R2 is determined in accordance with the rotation of second sun gear S2 and the rotation of second pinion carrier PC2. The output rotation (i.e., speed-increased rotation having a speed higher than the input rotation speed) is transmitted without change from second ring gear R2 to output shaft OUT. The seventh speed is thus established.

(Eighth Speed)

Figure 11:
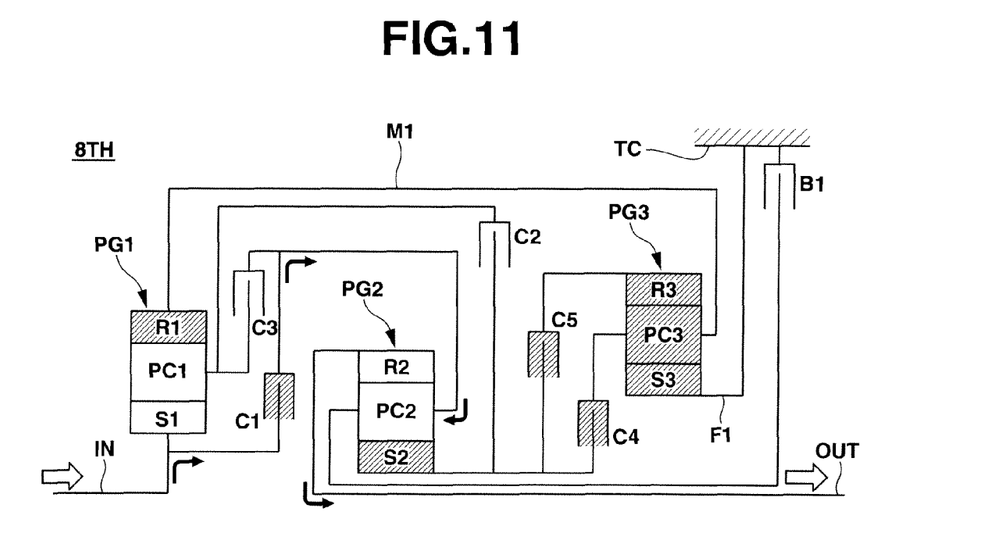
FIG. 11 is an explanatory diagram showing a shift operation at an eighth speed in the automatic transmission according to the embodiment.

At the eighth speed (8th), first clutch C1, fourth clutch C4 and fifth clutch C5 are brought into simultaneous engagements as indicated by hatching in FIG. 11.

Owing to the simultaneous engagements of fourth clutch C4 and fifth clutch C5, and third sun gear S3 being always kept in the fixed state relative to transmission case TC, first ring gear R1, second sun gear S2 and third planetary gearset PG3 (i.e., third sun gear S3, third pinion carrier PC3 and third ring gear R3) are fixed to transmission case TC.

As shown in FIG. 11, when input rotation is inputted to second pinion carrier PC2 via input shaft IN and first clutch C1, speed-increased positive rotation of second ring gear R2 is caused at second planetary gearset PG2 with second sun gear S2 being kept fixed, and then outputted. The output rotation (i.e., speed-increased rotation having a speed higher than both the input rotation speed and the seventh speed) is transmitted without change from second ring gear R2 to output shaft OUT. The eighth speed is thus established.

(Reverse Speed)

Figure 12:
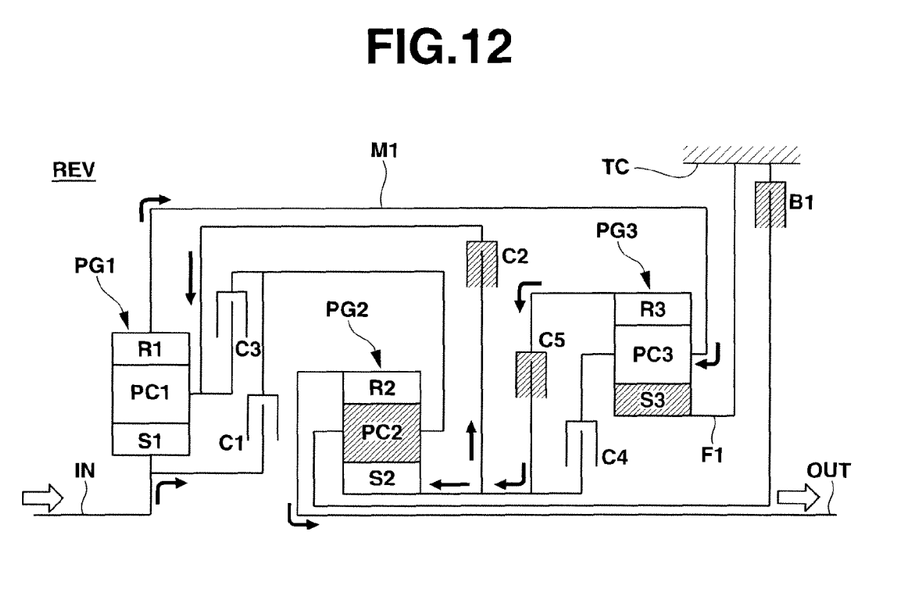
FIG. 12 is an explanatory diagram showing a shift operation at a reverse speed in the automatic transmission according to the embodiment.

At the reverse speed (Rev), second clutch C2, fifth clutch C5 and first brake B1 are brought into simultaneous engagements as indicated by hatching in FIG. 12.

Owing to the engagement of first brake B1, second pinion carrier PC2 is fixed to transmission case TC. Owing to the engagement of second clutch C2 and fifth clutch C5, first pinion carrier PC1, second sun gear S2 and third ring gear R3 are allowed to make the same rotation. Third sun gear S3 of third planetary gearset PG3 is always kept fixed to transmission case TC by first fixing member F1.

As shown in FIG. 12, when input rotation is inputted to first sun gear S1 via input shaft IN and rotation of second sun gear S2 is inputted to first pinion carrier PC1 via second clutch C2, speed-reduced positive rotation of first ring gear R1 is caused at first planetary gearset PG1 that has two inputs and one output. When the speed-reduced positive rotation of first ring gear R1 is inputted to third pinion carries PC3 via first rotary member M1, speed-increased positive rotation of third ring gear R3 is caused at third planetary gearset PG3 with third sun gear S3 being kept fixed. The speed-increased positive rotation of third ring gear R3 is inputted to second sun gear S2 via fifth clutch C5. At second planetary gearset PG2 with second pinion carrier PC2 being kept fixed, the rotation inputted to second sun gear S2 is converted into reverse rotation which is then outputted from second ring gear R2. The output rotation (i.e., speed-reduced reverse rotation having a speed lower than the input rotation speed) is transmitted without change from second ring gear R2 to output shaft OUT. The reverse speed is thus established.

Advantage of Embodiment in Comparison to Conventional Art

Figure 13:
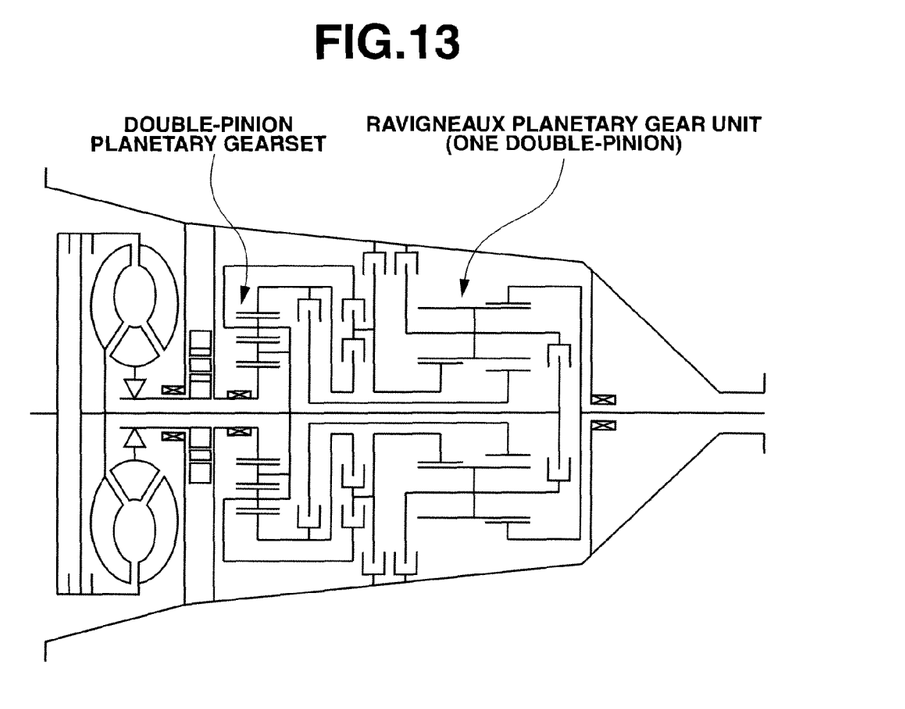
FIG. 13 is a skeleton diagram showing a construction of an automatic transmission of a conventional art.
Figure 14:
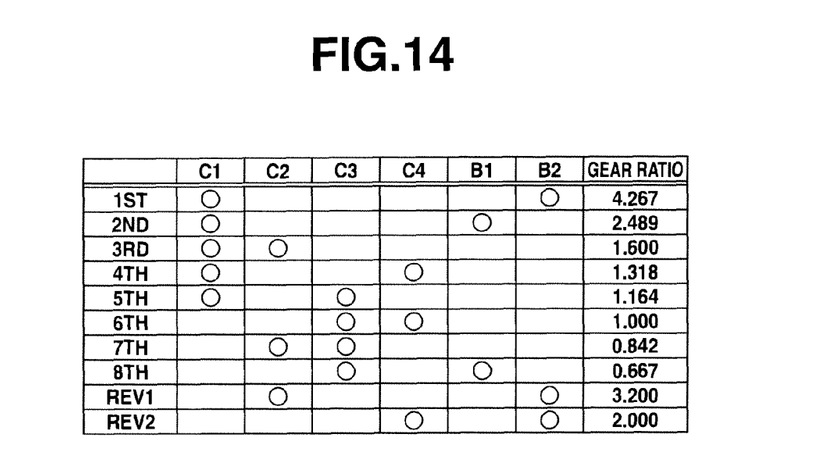
FIG. 14 is a table showing an engagement schedule of six friction elements of the automatic transmission of the conventional art for establishing eight forward speeds and two reverse speeds by simultaneous engagements of specific two friction elements selected from the six friction elements.
Figure 15:
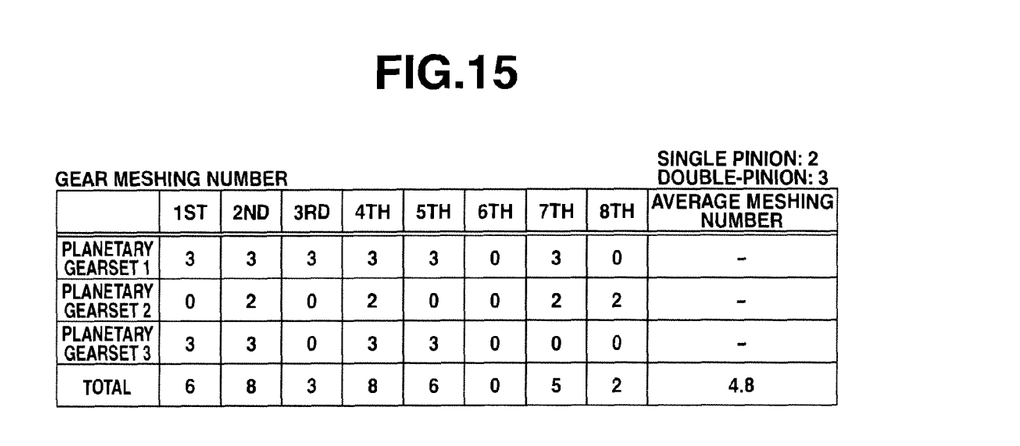
FIG. 15 is a table showing the number of meshing engagement between gears at the respective eight forward speeds in the automatic transmission of the conventional art.

FIG. 13 is a skeleton diagram showing a construction of an automatic transmission of a conventional art. FIG. 14 is a table showing an engagement schedule in which eight forward speeds and two reverse speeds are respectively established by simultaneous engagements of two friction elements selected from six friction elements of the automatic transmission of the conventional art. FIG. 15 is a table showing the gear meshing number at respective planetary gearsets to establish the eight forward speeds in the automatic transmission of the conventional art. Referring to FIG. 13 to FIG. 15, advantages of the automatic transmission according to the embodiment in comparison to that of the conventional art will be explained hereinafter.

First, the automatic transmission according to the embodiment and the automatic transmission of the conventional art as shown in FIG. 13 and FIG. 14 have the same shifting performance as follows.
(1) Eight forward speed and one reverse speed can be established by using three planetary gearsets and six friction elements.
(2) Shifting from one speed to the adjacent speed can be established by carrying out single changeover in which one of the specific friction elements engaged for establishing the one speed is brought into disengagement, and at the same time, one of the six friction elements except for the specific friction elements which is to be engaged for establishing the adjacent speed is brought into engagement.
(3) Lack of the driving force upon shifting to the reverse speed can be prevented by controlling the value of (|reverse speed gear ratio|/first speed gear ratio) to not less than 0.7.

The automatic transmission according to the embodiment has the following advantages as compared to the automatic transmission of the conventional art.

(a) Concerning Three Planetary Gearsets:

As shown in FIG. 13, the automatic transmission of the conventional art uses a double-pinion planetary gearset and a Ravigneaux planetary gear unit (a combination of a double-pinion planetary gearset and a single pinion planetary gearset). That is, the automatic transmission of the conventional art uses two double-pinion planetary gearsets, thereby having the following disadvantages.
(1) The gear meshing number is increased, resulting in deterioration in gear efficiency and gear noise in the automatic transmission.
(2) A diameter of the pinion gears is reduced, resulting in deterioration in endurance reliability.
(3) The number of parts of the automatic transmission is increased, resulting in an increase of the cost.

In contrast, the automatic transmission according to the embodiment uses three single pinion planetary gearsets including first planetary gearset PG1, second planetary gearset PG2 and third planetary gearset PG3. Therefore, the automatic transmission according to the embodiment has the following advantages in comparison to the automatic transmission of the conventional art using the double-pinion planetary gearsets.

(1) The gear meshing number at the single pinion planetary gearset is reduced as compared to that in the double-pinion planetary gearset. This results in enhancing gear efficiency and reducing gear noise in the automatic transmission. Specifically, in the double-pinion planetary gearset, the gear meshing number is three. On the other hand, in the single pinion planetary gearset, no meshing engagement occurs between the pinion gears adjacent to each other, and therefore, the gear meshing number is two. Accordingly, in this embodiment using the single pinion planetary gearsets, as shown in FIG. 3, an average meshing number that denotes an average of the gear meshing numbers at the eight forward speeds is 3.75. In contrast, in the conventional art using the two double-pinion planetary gearsets, as shown in FIG. 15, the average meshing number is 4.8. As a result, the average meshing number (i.e., 3.75) in this embodiment is reduced by 1.05 as compared to the average meshing number (i.e., 4.8) in the conventional art.

(2) A diameter of the pinion gear is reduced to thereby enhance endurance reliability of the planetary gearset. Specifically, in the single pinion planetary gearset, a plurality of pinion gears are arranged between the sun gear and the ring gear, each having a diameter corresponding to a distance between the sun gear and the ring gear. On the other hand, in the double-pinion planetary gearset, it is required that the double pinion gears each have a diameter smaller than a distance between the sun gear and the ring gear. Since the diameter of the pinion gear of the single pinion planetary gearset is larger than the diameter of the pinion gear of the double-pinion planetary gearset, rigidity and strength of a tooth flank of the pinion gear can be increased so that endurance reliability of the planetary gearset can be enhanced.

(3) The number of parts of the planetary gearset is reduced to thereby increase cost performance. For instance, in a case where four pairs of double pinion gears are arranged around the sun gear in the double-pinion planetary gearset, the total number of pinion gears is eight. On the other hand, in a case where four pinion gears are arranged around the sun gear in the single pinion planetary gearset, the total number of pinion gears is four which is smaller by four than that of the double-pinion planetary gearset having the four pairs of double pinion gears. As a result, it is possible to attain cost saving.

(b) Concerning the Number of Friction Elements to be Brought into Simultaneous Engagements at Respective Speeds:

In order to establish the eight forward speeds in the automatic transmission of the conventional art, two friction elements are brought into simultaneous engagements at the respective eight forward speeds as shown in FIG. 14. With this construction, the number of friction elements idling at the respective speeds is four. For instance, the friction elements idling at the first speed are second clutch C2, third clutch C3, fourth clutch C4 and first brake B1. There occurs drag at the idling four friction elements, thereby causing an increase in friction loss and deterioration in efficiency of driving energy transmission. For instance, in a case where the automatic transmission of the conventional art is applied to an engine powered vehicle, the friction loss caused by the idling four friction elements becomes a factor of deterioration in fuel economy.

In contrast, in order to establish the eight forward speeds in the automatic transmission of the embodiment, three friction elements are brought into simultaneous engagements at the respective eight forward speeds as shown in FIG. 2. With this construction, the number of friction elements idling at the respective speeds is three. For instance, the friction elements idling at the first speed is first clutch C1, second clutch C2 and fifth clutch C5. Accordingly, as compared to the automatic transmission of the conventional art, the friction loss that is caused at the idling friction elements in this embodiment can be reduced so that efficiency of driving energy transmission can be increased. For instance, in a case where the automatic transmission of the embodiment is applied to an engine powered vehicle, the fuel economy can be enhanced.

(c) Concerning Gear Ratio Coverage:

A range of gear ratio in the automatic transmission is indicated by gear ratio coverage (i.e., minimum speed gear ratio/maximum speed gear ratio) which is hereinafter simply referred to as "RC". The larger RC value is more desirable. In the automatic transmission of the conventional art, as shown in FIG. 14, the RC value of 6.397 (i.e., 4.267/0.667) is obtained, which is smaller than a required value of RC (i.e., 7.3 or more) which is needed to satisfy both start performance and high speed fuel economy.

In contrast, in the automatic transmission of this embodiment, as shown in FIG. 2, in a case where the gear ratio ρ1 of first planetary gearset PG1 is set at 0.480, the gear ratio ρ2 of second planetary gearset PG2 is set at 0.399 and the gear ratio ρ3 of third planetary gearset PG3 is set at 0.540, the RC value of 7.302 (i.e., 5.221/0.715) is obtained, while keeping an appropriate value of a step ratio between the gear ratios at the adjacent speeds. That is, in the automatic transmission of this embodiment, the RC value (i.e., 7.302) larger than the RC value (i.e., 6.397) in the automatic transmission of the conventional art is obtained, while keeping the appropriate value of the step ratio between the gear ratio at one speed and the gear ratio at another speed adjacent to the one speed. Therefore, in the automatic transmission of this embodiment, it is possible to attain both a good start performance at the minimum speed gear ratio and a high speed fuel economy at the maximum speed gear ratio. Here, the "appropriate value of the step ratio between the gear ratios at the adjacent speeds" means a value of the step ratio at which in a case where the step ratio between the gear ratios at the adjacent speeds is plotted to draw a characteristic curve of the step ratio, the characteristic curve drops with a smooth gradient from a low gear side toward a high gear side and then levels off.

Further, the rotation speed to be actually transmitted to the driving wheel is adjusted using a final gear ratio of final reduction gear that is disposed on a downstream side of the automatic transmission. Accordingly, as the RC value becomes larger, a freedom of adjustment by the final gear ratio can be increased. For instance, by adjusting the final gear ratio toward a lower side, application to the automatic transmission in a hybrid vehicle having no torque converter becomes advantageous. In addition, application to a gasoline engine and a diesel engine which are different in an optimal fuel economy and a maximum torque range from each other becomes advantageous.

The automatic transmission according to this embodiment has the following effects.

(1) The automatic transmission of this embodiment includes input shaft IN, output shaft OUT, first planetary gearset PG1 including first sun gear S1, first pinion carrier PC1 that supports first pinion gear P1 meshing with first sun gear S1, and first ring gear R1 meshing with first pinion gear P1, second planetary gearset PG2 including second sun gear S2, second pinion carrier PC2 that supports second pinion gear P2 meshing with second sun gear S2, and second ring gear R2 meshing with second pinion gear P2, third planetary gearset PG3 including third sun gear S3, third pinion carrier PC3 that supports third pinion gear P3 meshing with third sun gear S3, and third ring gear R3 meshing with third pinion gear P3, and six friction elements, the automatic transmission being capable of establishing at least eight forward speeds by suitably engaging and disengaging the six friction elements and outputting a torque from input shaft IN to output shaft OUT, wherein input shaft IN is always connected to first sun gear S1, output shaft OUT is always connected to second ring gear R2, third sun gear S3 is always kept in a fixed state relative to transmission case TC of the automatic transmission, first ring gear R1 and third pinion carrier PC3 are always connected to each other and constitute first rotary member M1, the six friction elements include a first friction element (i.e., first clutch C1) that selectively connects first sun gear S1 and second pinion carrier PC2, a second friction element (i.e., second clutch C2) that selectively connects first pinion carrier PC1 and second sun gear S2, a third friction element (i.e., third clutch C3) that selectively connects first pinion carrier PC1 and second pinion carrier PC2, a fourth friction element (i.e., fourth clutch C4) that selectively connects second sun gear S2 and first rotary member M1, a fifth friction element (i.e., fifth clutch C5) that selectively connects second sun gear S2 and third ring gear R3, and a sixth friction element (i.e., first brake B1) that is operative to interrupt rotation of the second pinion carrier, and at least eight forward speeds and one reverse speed are respectively established by simultaneous engagements of three friction elements selected from the six friction elements. with this construction, the automatic transmission of this embodiment can enhance gear efficiency, gear noise suppression, endurance reliability and cost performance and can reduce friction loss, thereby serving for increasing efficiency in driving energy transmission.

(2) The at least eight forward speeds which are respectively established by simultaneous engagements of three friction elements selected from the six friction elements include a first speed that is established by simultaneous engagements of the third friction element (i.e., third clutch C3), the fourth friction element (i.e., fourth clutch C4) and the sixth friction element (i.e., first brake B1), a second speed that is established by simultaneous engagements of the third friction element (i.e., third clutch C3), the fifth friction element (i.e., fifth clutch C5) and the sixth friction element (i.e., first brake B1), a third speed that is established by simultaneous engagements of the third friction element (i.e., third clutch C3), the fourth friction element (i.e., fourth clutch C4) and the fifth friction element (i.e., fifth clutch C5), a fourth speed that is established by simultaneous engagements of the second friction element (i.e., second clutch C2), the third friction element (i.e., third clutch C3) and the fifth friction element (i.e., fifth clutch C5), a fifth speed that is established by simultaneous engagements of the first friction element (i.e., first clutch C1), the third friction element (i.e., third clutch C3) and the fifth friction element (i.e., fifth clutch C5), a six speed that is established by simultaneous engagements of the first friction element (i.e., first clutch C1), the second friction element (i.e., second clutch C2) and the third friction element (i.e., third clutch C3), a seventh speed that is established by simultaneous engagements of the first friction element (i.e., first clutch C1), the second friction element (i.e., second clutch C2) and the fifth friction element (i.e., fifth clutch C5), and an eighth speed that is established by simultaneous engagements of the first friction element (i.e., first clutch C1), the fourth friction element (i.e., fourth clutch C4) and the fifth friction element (i.e., fifth clutch C5). With this construction, shifting from one speed to the adjacent speed can be attained by carrying out single changeover in which one of the three friction elements engaged for establishing the one speed is brought into disengagement and one of the six friction elements except for the three friction elements which is to be engaged for establishing the adjacent speed is brought into engagement. This results in such an advantage of simplifying shift control in the automatic transmission. Therefore, it is possible to keep the step ratio between the gear ratios at the adjacent speeds at an appropriate value, and at the same time, set the RC value to a required value that is needed to satisfy both start performance at the minimum speed gear ratio and high speed fuel economy at the maximum speed gear ratio.

(3) One reverse speed that is established by simultaneous engagements of three friction elements selected from the six friction elements can be established by simultaneous engagements of the second friction element (i.e., second clutch C2), the fifth friction element (i.e., fifth clutch C5) and the sixth friction element (i.e., first brake B1) as explained above. With this construction, even in a case where such a value of the gear ratio as to achieve respective appropriate values of the RC and the step ratio is selected, a value of (|reverse speed gear ratio|/first speed gear ratio) can approach 1 to thereby suppress occurrence of lack of the driving force upon starting at the reverse speed.

The present invention can be modified as follows without being limited to the embodiment described above. Although the gear ratio $\rho 1$ of first planetary gearset PG1 is set at 0.480, the gear ratio $\rho 2$ of second planetary gearset PG2 is set at 0.399 and the gear ratio $\rho 3$ of third planetary gearset PG3 is set at 0.540 in the embodiment, the respective gear ratios $\rho$ can be set within a range of 0.327 to 0.658. In a case where the respective gear ratios ρ of first to third planetary gearsets PG1, PG2 and PG3 are set within the range of 0.327 to 0.658 and set so as to obtain a high value of the RC and an appropriate value of the step ratio, an increase in size of the planetary gearsets and the transmission unit can be suppressed.

The automatic transmission according to the embodiment can be applied to a front-engine front-wheel-drive vehicle (i.e., a FF vehicle), a hybrid vehicle, an electric vehicle and a fuel cell powered vehicle without being particularly limited to a front-engine rear-wheel-drive vehicle (i.e., a FR vehicle) having a coaxial arrangement of the input shaft and the output shaft.

This application is based on a prior Japanese Patent Application No. 2009-075584 filed on Mar. 26, 2009. The entire contents of the Japanese Patent Application No. 2009-075584 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. An automatic transmission that includes an input shaft, an output shaft, a first planetary gearset including a first sun gear, a first pinion carrier that supports a first pinion gear meshing with the first sun gear, and a first ring gear meshing with the first pinion gear, a second planetary gearset including a second sun gear, a second pinion carrier that supports a second pinion gear meshing with the second sun gear, and a second ring gear meshing with the second pinion gear, a third planetary gearset including a third sun gear, a third pinion carrier that supports a third pinion gear meshing with the third sun gear, and a third ring gear meshing with the third pinion gear, and six friction elements, the automatic transmission being capable of establishing at least eight forward speeds by suitably engaging and disengaging the six friction elements and outputting a torque from the input shaft to the output shaft, wherein the input shaft is always connected to the first sun gear, the output shaft is always connected to the second ring gear, the third sun gear is always kept in a fixed state relative to a transmission case of the automatic transmission, the first ring gear and the third pinion carrier are always connected to each other and constitute a first rotary member, the six friction elements include a first friction element that selectively connects the first sun gear and the second pinion carrier, a second friction element that selectively connects the first pinion carrier and the second sun gear, a third friction element that selectively connects the first pinion carrier and the second pinion carrier, a fourth friction element that selectively connects the second sun gear and the first rotary member, a fifth friction element that selectively connects the second sun gear and the third ring gear, and a sixth friction element that is operative to interrupt rotation of the second pinion carrier, and at least eight forward speeds and one reverse speed are respectively established by simultaneous engagements of three friction elements selected from the six friction elements.

2. The automatic transmission as claimed in claim 1, wherein the at least eight forward speeds which are respectively established by simultaneous engagements of three friction elements selected from the six friction elements comprise a first speed that is established by simultaneous engagements of the third friction element, the fourth friction element and the sixth friction element, a second speed that is established by simultaneous engagements of the third friction element, the fifth friction element and the sixth friction element, a third speed that is established by simultaneous engagements of the third friction element, the fourth friction element and the fifth friction element, a fourth speed that is established by simultaneous engagements of the second friction element, the third friction element and the fifth friction element, a fifth speed that is established by simultaneous engagements of the first friction element, the third friction element and the fifth friction element, a sixth speed that is established by simultaneous engagements of the first friction element, the second friction element and the third friction element, a seventh speed that is established by simultaneous engagements of the first friction element, the second friction element and the fifth friction element, and an eighth speed that is established by simultaneous engagements of the first friction element, the fourth friction element and the fifth friction element.

3. The automatic transmission as claimed in claim 1, wherein the one reverse speed which is established by simultaneous engagements of three friction elements selected from the six friction elements is established by simultaneous engagements of the second friction element, the fifth friction element and the sixth friction element.

* * * * *